United States Patent
Takatani et al.

(10) Patent No.: US 7,593,216 B2
(45) Date of Patent: Sep. 22, 2009

(54) SOLID ELECTROLYTIC CAPACITOR AND METHOD OF MANUFACTURING SOLID ELECTROLYTIC CAPACITOR

(75) Inventors: Kazuhiro Takatani, Takatsuki (JP); Mutsumi Yano, Hirakata (JP); Hiroaki Izu, Hirakata (JP); Takahisa Iida, Tottori (JP); Takashi Umemoto, Hirakata (JP); Hiroshi Nonoue, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 177 days.

(21) Appl. No.: 11/802,975

(22) Filed: May 29, 2007

(65) Prior Publication Data

US 2007/0285876 A1    Dec. 13, 2007

(30) Foreign Application Priority Data

May 31, 2006    (JP)    ............................ P2006-151690
Mar. 13, 2007   (JP)    ............................ P2007-063352

(51) Int. Cl.
*H01G 4/06*    (2006.01)
*H01G 5/013*   (2006.01)

(52) U.S. Cl. ..................................... 361/524; 29/25.03

(58) Field of Classification Search ......... 361/524–525, 361/523; 29/25.03
See application file for complete search history.

(56) References Cited

U.S. PATENT DOCUMENTS

| | | | |
|---|---|---|---|
| 4,965,657 A | 10/1990 | Ogata et al. | |
| 6,433,417 B1 * | 8/2002 | Aoyama | ..................... 257/696 |
| 2005/0267237 A1 | 12/2005 | Kuroda | |
| 2006/0023401 A1 | 2/2006 | Naito et al. | |

FOREIGN PATENT DOCUMENTS

| | | |
|---|---|---|
| JP | 11-329902 | 11/1999 |
| JP | 2004-356400 | 12/2004 |
| JP | 2005-252224 | 9/2005 |
| WO | WO 2005076297 A1 * | 8/2005 |

* cited by examiner

*Primary Examiner*—Eric Thomas
(74) *Attorney, Agent, or Firm*—NDQ&M Watchstone LLP

(57) ABSTRACT

A solid electrolytic capacitor includes a capacitor element having a niobium oxide layer arranged between an anode and a cathode, and an outer package covering the capacitor element. The niobium oxide layer contains fluorine and phosphorus, and the outer package contains epoxy resin, phenol resin, filler and an imidazole compound.

8 Claims, 1 Drawing Sheet

SOLID ELECTROLYTIC CAPACITOR AND METHOD OF MANUFACTURING SOLID ELECTROLYTIC CAPACITOR

CROSS REFERENCE TO RELATED APPLICATIONS

This application is based upon and claims the benefit of priority from prior Japanese Patent Application No. 2006-151690, filed on May 31, 2006; and prior Japanese Patent Application No. 2007-63352, filed on Mar. 13, 2007; the entire contents of which are incorporated herein by reference.

BACKGROUND OF THE INVENTION

1. Field of the Invention

The present invention relates to a solid electrolytic capacitor, and a method of manufacturing the solid electrolytic capacitor.

2. Description of the Related Art

Conventionally, a small solid electrolytic capacitor to be mounted on a surface of a printed circuit board or the like is manufactured by resin-molding a capacitor element including a dielectric layer formed by anodizing valve metal. In response to a demand for an increase in capacitance of a solid electrolytic capacitor, one using niobium oxide serving as a dielectric layer has been attracting attention.

In comparison with tantalum oxide, niobium oxide is susceptible to a heat treatment, and a leakage current tends to increase. For this reason, there are proposed some solid electrolytic capacitors each having a certain element structure (refer to Japanese Patent Publication No. Heisei 11-329902, and Japanese Patent Publication No. 2005-252224). In these solid electrolytic capacitors using niobium oxide, it is made possible to achieve suppression of a leakage current by adding nitrogen or fluorine in a niobium oxide layer.

In the solid electrolytic capacitors including the aforementioned niobium oxide layer, however, there are some cases where a leakage current increases when the produced capacitor element is resin-molded.

SUMMARY OF THE INVENTION

As the result of a dedicated examination done by the inventors of the present application in order to achieve the aforementioned object, the inventors have found out that the leakage current can be reduced by adding a specific element to the niobium oxide layer serving as a dielectric layer, and by using a specific resin composition as an outer package.

Specifically, a solid electrolytic capacitor according to a first aspect of the present invention includes a capacitor element having a niobium oxide layer arranged between an anode and a cathode, and an outer package covering the capacitor element. The aforementioned niobium oxide layer contains fluorine and phosphorus, and the outer package contains epoxy resin, phenol resin, filler and an imidazole compound.

In the solid electrolytic capacitor according to the first aspect, as mentioned above, the niobium oxide layer contains fluorine and phosphorus while the outer package contains epoxy resin, phenol res filler and the imidazole compound. By employing such a configuration, the niobium oxide layer functions as a dielectric layer can suppress crystallization of niobium oxide caused by a heat process such as a reflow soldering process or a molding process of the outer package. Thus, the occurrence of a crack in the niobium oxide layer can be suppressed.

Moreover, by adding the imidazole compound in the resin composition of the outer package of the capacitor element, the imidazole compound functions as a curing accelerator. Thus, stress which occurs when curing the resin composition in the molding process can be suppressed. Thereby, the occurrence of a crack in the niobium oxide layer can be further suppressed. Accordingly, reduction in insulating properties between the anode and the cathode can be suppressed. As a result, a solid electrolytic capacitor having a high capacitance with a small leakage current can be obtained.

In the solid electrolytic capacitor according to the first aspect, it is preferable that the concentration of fluorine has the maximum value at an area on the anode side of the niobium oxide layer, and the concentration of phosphorus has the maximum value at an area on the cathode side of the niobium oxide layer. By employing such a configuration, the occurrence of a crack can be further suppressed. Thus, the leakage current can be reduced.

In the solid electrolytic capacitor according to the first aspect, it is preferable that the mixing ratio of the imidazole compound in the outer package is in the range of 0.5 to 10 part by weight with respect to 100 part by weight of the epoxy resin. By employing such a configuration, stress which occurs when curing the resin composition in the molding process can be suppressed. Thus, the occurrence of a crack can be further reduced, and thereby the leakage current can be reduced.

In the solid electrolytic capacitor according to the first aspect, it is preferable that the imidazole compound is any one of 2-phenyl-4-methyl-imidazole, 2-ethyl-4-methyl-imidazole, and 2-phenyl-imidazole. By employing such a configuration, stress which occurs when curing the resin composition in the molding process can be suppressed. Thus, the occurrence of a crack can be further reduced, and thereby the leakage current can be reduced.

In the solid electrolytic capacitor according to the first aspect, it is preferable that the ratio of the filler in the outer package is within the range of 75 to 85 vol %. More preferably, the ratio of the filler in the outer package is within the range of 78 to 82 vol %. By employing such a configuration, stress which occurs when curing the resin composition in the molding process can be suppressed. Thus, the occurrence of a crack can be further reduced, and thereby the leakage current can be reduced.

In the solid electrolytic capacitor according to the first aspect, it is preferable that the filler contain particles of spherical shape, and that the mixing ratio of the particles of spherical shape is within the range of 20 to 90 weight % with respect to the total weight of the filler. In cases where the curing rate of the resin composition is large and small, the amount of stress at the time of curing the resin composition tends to be large. However, the larger the mixing ratio of the particles of spherical shapes in the filler, the greater the curing rate of the resin composition. Accordingly, by employing such a configuration, the curing rate of the resin composition can be controlled. Thereby, the amount of stress at the time of curing the resin composition in the molding process can be further suppressed. Thus, the occurrence of a crack can be further reduced, and thereby the leakage current can be further reduced.

In the solid electrolytic capacitor according to the first aspect, it is preferable that the thickness of the niobium oxide layer is not greater than 150 nm. By employing such a configuration, the amount of stress at the time of curing the resin composition in the molding process can be further suppressed. Thus, the occurrence of a crack can be further reduced, and thereby the leakage current can be reduced.

Furthermore, a method of manufacturing a solid electrolytic capacitor according to a second aspect of the invention includes the steps of: forming a capacitor element including a niobium oxide layer arranged between an anode and a cathode; and molding an outer package to cover the capacitor element. The step of forming the capacitor element includes a step of anodizing an anode containing niobium in an aqueous solution containing fluoride ions, and then anodizing the anode in an aqueous solution containing phosphate ions. The step of molding the outer package includes a step of embedding the capacitor element in a resin composition containing epoxy resin, phenol resin, filler and the imidazole compound, and then curing the resin composition by heat.

Moreover, in the method of manufacturing a solid electrolytic capacitor according to the second aspect, the anode is anodized in an aqueous solution containing phosphate ions after the anode containing niobium is anodized in an aqueous solution containing fluoride ions. Thus, the niobium oxide layer containing fluorine and phosphorus can be easily formed. Furthermore, by employing such a configuration, it is possible that the concentration of fluorine to have the maximum value at the area on the anode side of the niobium oxide layer. Further, the concentration of fluorine can be larger in an area near the boundary of the anode and the niobium oxide layer. Moreover, it is possible that the concentration of phosphorus to have the maximum value at the area on the cathode side of the niobium oxide layer. Further, phosphorus can be contained substantially in an area near the boundary on the cathode side of the niobium oxide layer. Thereby, the niobium oxide layer functions as a dielectric layer of the capacitor element can suppress crystallization of the niobium oxide caused by a heat process or the like such as a reflow soldering process or the molding process of the outer package. Thus, the occurrence of a crack in the niobium oxide layer can be suppressed.

In addition, the resin composition containing epoxy resin, phenol resin, filler, and the imidazole compound is cured by heat in the molding process. Hence, stress which occurs when the resin composition is cured in the molding process can be suppressed. Thereby, the occurrence of a crack can be further suppressed, and then, the leakage current can be reduced. As a result, reduction in insulating properties between the anode and cathode can be suppressed. Accordingly, a solid electrolytic capacitor having a high capacitance with a small leakage current can be easily manufactured.

In the method of manufacturing a solid electrolytic capacitor according to the second aspect, the temperature used when the resin composition is cured is preferably not greater than 150° C. By employing such a configuration, stress which occurs when the resin composition is cured in the molding step can be suppressed. Thus, the occurrence of a crack in the niobium oxide layer can be further suppressed, and thereby the leakage current can be reduced.

DETAILED DESCRIPTION OF THE EMBODIMENTS

Hereinafter, a solid electrolytic capacitor according to an embodiment of the present invention will be described. It is to be noted that the present invention is not limited to the following embodiment, and that various modifications are possible without departing from the scope of the invention.

Figure 1:
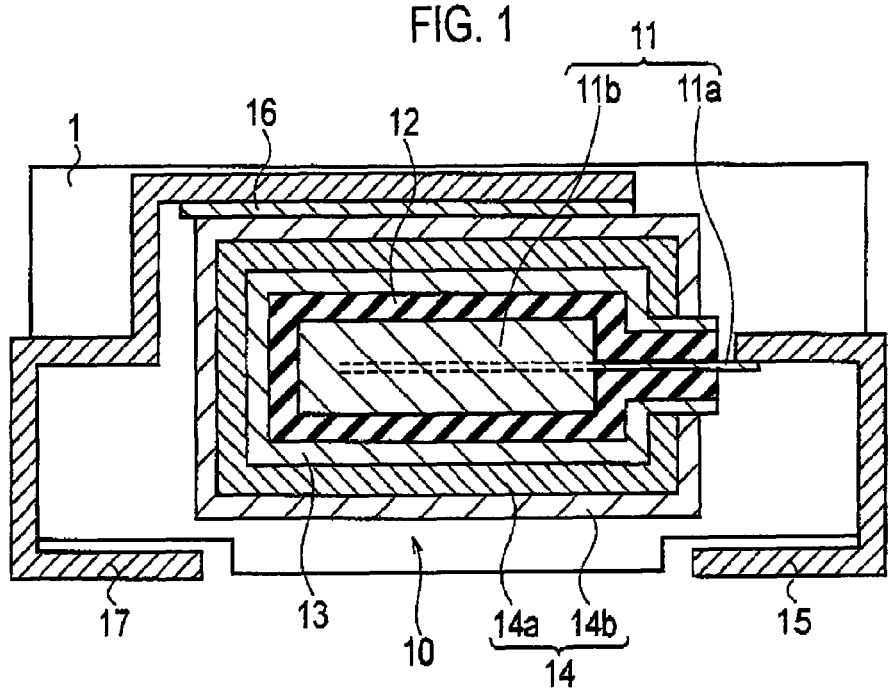
FIG. 1 is a cross-sectional view for explaining a structure of a solid electrolytic capacitor according to an embodiment of the present invention.

FIG. 1 is a cross-sectional view for explaining a structure of a solid electrolytic capacitor according to the embodiment of the present invention.

As shown in FIG. 1, the solid electrolytic capacitor according to the embodiment of the present invention includes a capacitor element 10 embedded inside an outer package 1 which is of a rectangular solid shape, and which is made of epoxy resin or the like.

The capacitor element 10 includes an anode 11, a niobium oxide layer 12 containing fluorine and phosphorus formed on the anode 11, a conductive polymer layer 13 formed on the niobium oxide layer 12, and a cathode 14 formed on the conductive polymer layer 13. As in the manner described above, in the capacitor element 10, the niobium oxide layer 12 is arranged between the anode 11 and the cathode 14, and the niobium oxide layer 12 functions as a so-called dielectric layer. In addition, the conductive polymer layer 13 is arranged between the niobium oxide layer 12 and the cathode 14, and functions as a so-called electrolyte layer.

The anode 11 includes an anode lead 11a made of tantalum or the like, a substrate 11b made of a porous sintered body formed by sintering niobium powder or niobium alloy powder. A part of the anode lead 11a is embedded in the substrate 11b. In addition, one end of an anode terminal 15 is connected onto the anode lead 11a, and another end of the anode terminal 15 is exposed from the outer package 1.

The cathode 14 has a structure in which a first conductive layer 14a containing carbon particles formed on the conductive polymer layer 13, and a second conductive layer 14b containing silver particles formed on the first conductive layer 14a are superimposed over one another in this order. Moreover, one end of a cathode terminal 17 is connected onto the cathode 14 with a third conductive layer 16 containing silver particles interposed therebetween, and another end of the cathode terminal 17 is exposed from the outer package 1.

The outer package 1 is constituted of a resin composition containing an imidazole compound, epoxy resin, phenol resin, and filler made of silica particles and the like. Here, the phenol resin and the imidazole compound respectively function as a curing agent and a curing accelerator.

Next, a method of manufacturing a solid electrolytic capacitor according to an embodiment of the present invention will be explained.

First, the anode 11 including the anode lead 11a and the substrate 11b made of a porous sintered body is formed by sintering, in a vacuum, a compact which is formed of niobium powder or niobium alloy powder, and in which one end of the anode lead 11a is embedded.

Next, after anodizing the anode 11 in an aqueous solution containing fluoride ions, the anode 11 is subsequently anodized in an aqueous solution containing phosphate ions. Thereby, the niobium oxide layer 12 containing fluorine and phosphorus is formed in such a manner that the niobium oxide layer 12 covers a periphery of the anode 11.

Next, the conductive polymer layer 13 is formed on the niobium oxide layer 12 by polymerization or the like. Thereby, the conductive polymer layer 13 is formed in a such manner that the conductive polymer layer 13 covers a periphery of the niobium layer 12, and fills in a concave portion on the surface of, and the inside of the substrate 11b.

Next, the first conductive layer 14a is formed on the conductive polymer layer 13 by coating carbon paste in such a manner that the carbon paste covers a periphery of the conductive polymer layer 13, and then by drying the paste. Thereafter, the second conductive layer 14b is formed on the first conductive layer 14a by coating silver paste on the first conductive layer 14a, and then by drying the silver paste. Thereby, the cathode 14 constituted of the first conductive layer 14a and the second conductive layer 14b is formed on the conductive polymer layer 13, and the capacitor element 10 is thus produced.

Next, by means of welding, the anode terminal 15 is connected onto the anode lead 11a exposed from the substrate 11b. In addition, the third conductive layer 16 containing silver particles is formed between the cathode 14 and the cathode terminal 17, by drying a silver adhesive agent containing silver particles interposed between the cathode 14 and the cathode terminal 17 which are closely attached to each other. Thus, the cathode 14 and the cathode terminal 17 are connected to each other with the third conductive layer 16 interposed therebetween.

Furthermore, the capacitor element 10 including the anode terminal 15 and the cathode terminal 17 therein is embedded in a resin composition containing an imidazole compound, epoxy resin, phenol resin, and filler made of silica particles and the like with a predetermined compounding ratio. Then, by causing this resin composition to be cured by heat, the outer package 1 including the capacitor element 10 embedded therein is formed. As the molding process for covering this capacitor element 10 with the outer package 1, a transfer molding process or the like may be used. According to the method described so far, the solid electrolytic capacitor of the embodiment of the present invention is produced.

In the solid electrolytic capacitor according to this embodiment, the niobium oxide layer 12 contains fluorine and phosphorus, and the outer package 1 contains epoxy resin, phenol resin, filler and an imidazole compound. Accordingly, the niobium oxide layer 12 functions as a dielectric layer of the capacitor element 10 can suppress crystallization of the niobium oxide caused by a heat treatment or the like such as a reflow soldering process or the process of molding the outer package 1. Thus, the occurrence of a crack in the niobium oxide layer 12 can be suppressed.

Furthermore, by adding an imidazole compound in the resin compound which is the outer package 1 of the capacitor element 10, the imidazole compound functions as the curing accelerator can suppress stress occurring during the curing of the resin composition in the molding process. Thus, the occurrence of a crack in the niobium oxide layer 12 can be further suppressed. As a result, reduction in the insulating properties between the anode 11 and the cathode 14 can be suppressed. Thus, a solid electrolytic capacitor of a high capacitance with a small leakage current can be obtained.

In addition, in the aforementioned embodiment, after the anode 11 containing niobium is anodized in an aqueous solution containing fluoride ions, the anode 11 is anodized in an aqueous solution containing phosphate ions. Thereby, the niobium oxide layer 12 containing fluorine and phosphorus can be easily formed. Furthermore, by employing such a structure, the concentration of fluorine has the maximum value at an area on the anode 11 side of the niobium oxide layer 12. Further, the concentration of fluorine in an area near the boundary surface of the anode 11 and the niobium oxide layer 12 can be greater than that in other areas. In the meantime, the concentration of phosphorus has the maximum value at an area on the cathode 14 side of the niobium oxide layer 12. Further, phosphorus can be included in an area near the boundary surface between the niobium oxide layer 12 and the conductive polymer layer 13. Here, the boundary surface is the boundary substantially on the cathode 14 side of the niobium oxide layer 12. Thereby, the niobium oxide layer 12 functions as a dielectric layer of the capacitor element 10 can suppress crystallization of the niobium oxide caused by a heat treatment such as a reflow soldering process or the process of molding the outer package. Thus, the occurrence of a crack in the niobium oxide layer 12 can be suppressed.

EXAMPLE

Next, solid electrolytic capacitors were produced on the basis of the aforementioned embodiment, and the produced solid electrolytic capacitors were evaluated.

Experiment 1

In a solid electrolytic capacitor of Experiment 1, a substrate 11b was formed by sintering niobium particles each having an average particle diameter of approximately 1 μm.

In addition, a niobium oxide layer 12 was formed by first anodizing an anode 11 at a constant voltage of about 20V for about 10 hours in an ammonium fluoride aqueous solution of about 0.1 weight % of which temperature was maintained at about 60° C., and then by anodizing the resultant anode 11 at a constant voltage of about 20V for about 10 hours in a phosphoric acid aqueous solution of about 0.1 weight % of which temperature was maintained at about 60° C. Here, an ammonium fluoride aqueous solution and a phosphoric acid aqueous solution are respectively examples of "an aqueous solution containing fluoride ions" and "an aqueous solution containing phosphate ions" of the present invention.

Furthermore, polypyrrole formed by means of polymerization or the like was used as a conductive polymer layer 13.

Moreover, an outer package 1 was formed in the following manner. First, a resin composition obtained by compounding about 55 part by weight of phenol resin, about 800 part by weight of silica particles, about 5 part by weight of 2-phenyl-4-methyl-imidazole, about 5 part by weight of antimony oxide, about 2 part by weight of carbana wax, about 3 part by weight of γ-glycidyloxypropyl-trimethoxysilane, and about 1 part by weight of carbon black, with respect to 100 part by weight of biphenyl-type epoxy resin, were mixed for about five minutes at approximately 110° C. Thereafter, the resultant resin composition was cooled, and then smashed. It should be noted that silica particles are an example of "filler" of the present invention. Moreover, it was observed that the silica particles mixed into the resin composition included spherical silica particles of about 75 weight % of the total weight, each of which has a spherical shape (the maximum particle diameter: about 40 μm and the average particle diameter: 3 μm). The remaining silica particles thereof are about 25 weight % of the total weight, and are of indeterminate form (the maximum particle diameter: about 20 μm, the average particle diameter: 2 μm). Moreover, the ratio of the silica particles is about 78 vol %. In addition, a capacitor element 10 placed in a metal mold is processed so that the capacitor element 10 is embedded in this resin composite by a transfer molding process. Then, this resin composition is cured by heat under the conditions of a heating temperature, about 140° C.; pressure, about 150 kg/cm$^2$; and a heating duration, about 90 seconds.

Experiment 2

The solid electrolytic capacitor of Experiment 2 was produced in a similar manner to that in Experiment 1 except that niobium alloy particles containing about 0.5 weight % of aluminum was used for the anode 11 in place of the niobium particles.

Experiment 3

The solid electrolytic capacitor of Experiment 3 was produced in a similar manner to that in Experiment 1 except that the anodization in a phosphoric add aqueous solution was not performed. That is, the niobium oxide layer of the solid electrolytic capacitor of Experiment 3 was formed by only anodization in an ammonium fluoride aqueous solution.

Experiment 4

The solid electrolytic capacitor of Experiment 4 was produced in a similar manner to that in Experiment 1 except that the anodization in an ammonium fluoride aqueous solution was not performed. That is, the niobium oxide layer of the solid electrolytic capacitor of Experiment 4 was formed by anodization only in a phosphoric acid aqueous solution.

Experiment 5

The solid electrolytic capacitor of Experiment 5 was produced in a similar manner to that in Experiment 1 except that the niobium oxide layer was formed by anodizing the niobium oxide layer not in an ammonium fluoride aqueous solution but only in a phosphoric aqueous solution, and thereafter by cleaning the niobium oxide layer by an approximately 0.005 weight % nitric acid aqueous solution.

Experiments 6 and 7

The solid electrolytic capacitors of Experiments 6 and 7 were produced in a similar manner to that in Experiment 1 except that, instead of adding 2-phenyl-4-methyl-imidazole as a curing accelerator in the resin composition, one of triethylamine and triphenylphosphine was added therein.

Experiment 8

The solid electrolytic capacitor of Experiment 8 was produced in a similar manner to that in Experiment 4 except that, instead of adding 2-phenyl-4-methyl-imidazole as a curing accelerator in the resin composition, triethylamine was added therein.

(Evaluation)

Figure 2:
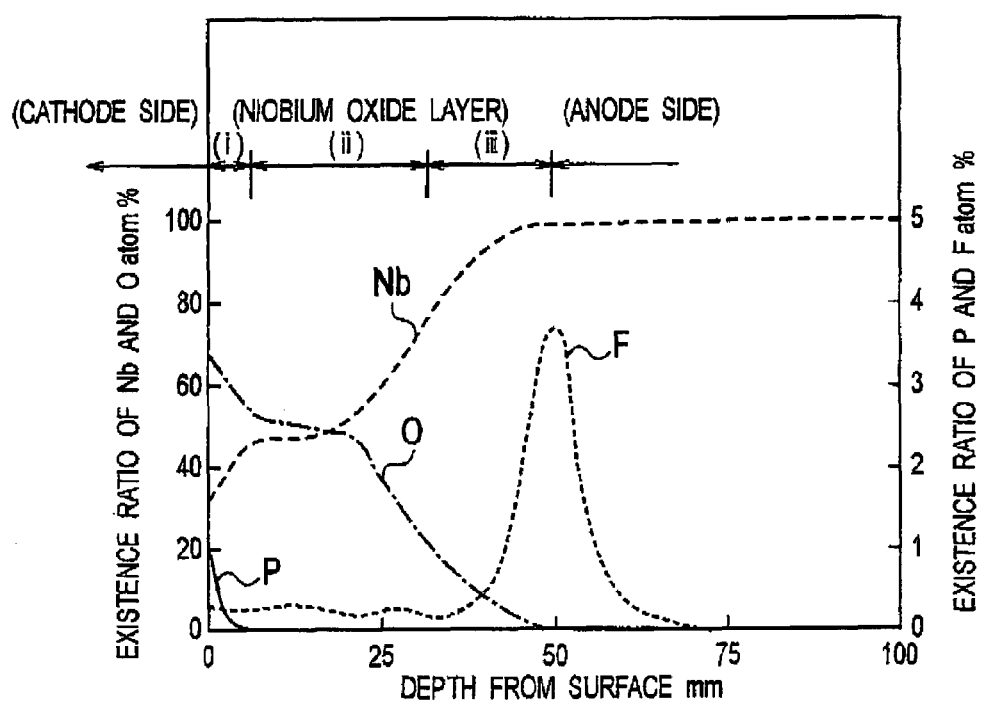
FIG. 2 is a diagram showing the results of measurement, using an X-ray photoelectron spectroscopy (XPS), of the niobium oxide layer produced in Experiment 1.

A composition analysis in the depth direction was performed on the niobium oxide layers of the solid electrolytic capacitors produced respectively in Experiments. FIG. 2 shows the results of measurement using the XPS of the niobium oxide layer 12 produced in Experiment 1. Note that the measurement was performed before forming the conductive polymer layer 13. In FIG. 2, the vertical axis indicates contents of the element, and the horizontal axis indicates the depth of the niobium oxide layer from the surface.

According to FIG. 2, it was found out that the thickness of the niobium oxide layer 12 was approximately 50 nm since oxygen was distributed from the surface to a depth of approximately 50 nm. In addition, it was found out that the niobium oxide layer 12 contains fluorine and phosphorus. In an area (i) which is from the surface (on which the cathode is formed) of the niobium oxide layer to a depth of about 6 nm, there exists the maximum of about 1 atom % of phosphorus. However, phosphorus barely exists in other areas, the concentration of phosphorus has the maximum value at an area on the cathode 14 side of the niobium oxide layer 12, and it can be seen that phosphorus is contained substantially only in an area near the boundary on the cathode 14 side of the niobium oxide layer 12. Moreover, in an area (iii) having a depth of about 20 nm, and being near the boundary of the niobium oxide layer 12 and the anode 11, a high concentration (about 4 atom %) of fluorine exists. In addition, a low concentration (about 0.3 atom %) of fluorine is contained in the area (i), and an area (ii) which is the area between the areas (i) and (iii), and the concentration of fluorine has the maximum value at an area on the anode 11 side of the niobium oxide layer 12.

Moreover, in the present invention, the area on the cathode 14 side of the niobium oxide layer 12 represents an area provided in the cathode 14 direction from the center of the thickness of the niobium oxide layer 12. The area on the anode 11 side of the niobium oxide layer 12 represents an area provided in the anode 11 direction from the center of the thickness of the niobium oxide layer 12.

Furthermore, composition distributions of the niobium oxide layers produced respectively in other Experiments were evaluated in the same manner as the aforementioned one. As a result, it was found out that any one of the niobium oxide layers had the thickness of about 50 nm. In addition, any one of the niobium oxide layers of Experiments 2, 6 and 7 contained fluorine and phosphorus as in the niobium oxide layer of Experiment 1, and the fluorine and phosphorous of the niobium oxide layers are respectively distributed in the areas (i), (ii) and (iii) in a similar manner to those in Experiment 1. In addition, fluorine was not contained in any one of the niobium oxide layers of Experiments 4 and 5, and phosphorus was contained only in the areas (i) of niobium oxide layers respectively of Experiments 4 and 5. Moreover, in the niobium oxide layer of Experiment 3, phosphorus was not contained, and a large concentration of fluorine is contained in the area (iii), and a small concentration of fluorine was in the other areas (i) and (ii).

Next, a constant voltage of about 5V is supplied between the anode terminals and the cathode terminals of the solid electrolytic capacitors produced respectively in aforementioned Experiments, and then each leakage current was measured approximately 20 seconds after supplying the voltage. The results of measurements are shown in Table 1 below.

TABLE 1

| | Anode | Elements contained in Niobium Oxide Layer | Curing accelerator in outer package | Leak current (µA) |
|---|---|---|---|---|
| Experiment 1 | Niobium | Fluorine, phosphorus | 2-phenyl-4-methyl-imidazole | 30 |
| Experiment 2 | Niobium Alloy | Fluorine, phosphorus | 2-phenyl-4-methyl-imidazole | 25 |
| Experiment 3 | Niobium | Fluorine | 2-phenyl-4-methyl-imidazole | 300 |
| Experiment 4 | Niobium | Phosphorus | 2-phenyl-4-methyl-imidazole | 600 |
| Experiment 5 | Niobium | Phosphorus | 2-phenyl-4-methyl-imidazole | 550 |
| Experiment 6 | Niobium | Fluorine, phosphorus | Triethylamine | 450 |
| Experiment 7 | Niobium | Fluorine, phosphorus | Triphenylphosphine | 500 |
| Experiment 8 | Niobium | Phosphorus | Triethylamine | 540 |

As shown in Table 1, it was found that the leakage cents of the solid electrolytic capacitors of Experiments 1 and 2 were sufficiently reduced in comparison with the other solid electrolytic capacitors. Specifically, in a case where the niobium oxide layer contained only any one of fluorine and phosphorus, reduction in the leakage current was not observed, even with the outer package containing the imidazole compound. Even in a case where the niobium oxide layer contained fluorine and phosphorus, reduction in the leakage current was not observed unless the outer package contained the imidazole compound. As a result, it was found out that the leakage current could be effectively reduced in a case where the niobium oxide layer contained fluorine and phosphorus, and where the outer package contained the imidazole compound. In addition, it was found out that, instead of niobium alone, an alloy containing niobium may be used as the anode.

Experiments 9 to 13

Next, a relationship between an imidazole compound in the outer package and the leakage current was examined.

The solid electrolytic capacitors of Experiments 9 to 13 were produced in a similar manner to that in Experiment 1 except that instead of adding 2-phenyl-4-methyl-imidazole to the resin composition as a curing accelerator, 2-ethyl-4-methyl-imidazole, 2-methyl-imidazole, 2-phenyl-imidazole, 2-phenyl-imidazoline, and 2-heptadecyl imidazole were respectively added. Then, the leakage currents of the solid electrolytic capacitors produced were evaluated in a similar manner to that of Experiment 1. The results of the evaluation are shown in Table 2.

TABLE 2

|  | Curing accelerator in outer package | Leak Current (μA) |
| --- | --- | --- |
| Experiment 9 | 2-ethyl-4-methyl-imidazole | 30 |
| Experiment 10 | 2-methyl-imidazole | 35 |
| Experiment 11 | 2-phenyl-imidazole | 30 |
| Experiment 12 | 2-phenyl-imidazoline | 35 |
| Experiment 13 | 2-heptadecyl-imidazole | 40 |

As shown in Table 2, it was found out that any of the leakage currents of the solid electrolytic capacitors of Experiments 9 to 13 was sufficiently smaller than the leakage currents of the solid electrolytic capacitors of Experiments 3 to 8. In addition, it was found out that any of the leakage currents of the solid electrolytic capacitors of Experiments 9 to 13 was reduced to a similar extent to those of the solid electrolytic capacitors of Experiments 1 and 2. In particular, since the leakage currents of the solid electrolytic capacitors of Experiments 1, 2, 9, and 11 are low, it can be stated that as the imidazole compound to be added into the outer package, one of 2-phenyl-4-methyl-imidazole, 2-ethyl-4-methyl-imidazole and 2-phenyl-imidazole is preferably used for the purpose of reducing a leakage current.

Experiments 14 to 21

Next, a relationship between the additive amount of imidazole compound in the outer package and the leakage current was examined. The solid electrolytic capacitors of Experiments 14 to 21 were produced in a similar manner to that of Experiment 1 were produced except that, instead of adding about 5 part by weight of 2-phenyl-4-methyl-imidazole with respect to 100 part by weight of epoxy resin, about 0.4, 0.5, 1, 2, 3, 7, 10 and 12 part by weight thereof were respectively added. Then, the leakage currents of the produced solid electrolytic capacitors were evaluated in a similar manner to that of Experiment 1. The results of the evaluation are shown in Table 3.

TABLE 3

|  | Additive of curing accelerator (part by weight) | Leak current (μA) |
| --- | --- | --- |
| Experiment 14 | 0.4 | 150 |
| Experiment 15 | 0.5 | 60 |
| Experiment 16 | 1 | 50 |
| Experiment 17 | 2 | 35 |
| Experiment 18 | 3 | 35 |
| Experiment 1 | 5 | 30 |
| Experiment 19 | 7 | 40 |
| Experiment 20 | 10 | 65 |
| Experiment 21 | 12 | 155 |

As shown in Table 3, it was found out that any of the leakage currents of the solid electrolytic capacitors of Experiments 1, and 14 to 21 was sufficiently smaller than the leak currents of the solid electrolytic capacitors of Experiments 3 to 8. In particular, since the leakage currents of Experiments 1, 15 to 20 are small it can be stated that, as the mixing ratio of the imidazole compound in the outer package, the range of about 0.5 to 10 part by weight thereof with respect to 100 part by weight of epoxy resin is preferable, and that the range of about 2 to 7 part by weight thereof is further preferable.

Experiments 22 to 27

Next, a relationship of the ratio of filler in the outer package and the leakage current was examined. The solid electrolytic capacitors of Experiments 22 to 27 were produced in a similar manner to that of Experiment 1 except that, instead of adding about 800 part by weight of silica particles with respect to 100 part by weight of biphenyl-type epoxy resin to be mixed as the filler, about 650, 700, 825, 900, 1050 and 1150 part by weight thereof were respectively mixed. The ratios of the silica particles were about 74 vol %, 75 vol %, 80 vol %, 82 vol %, 85 vol % and 86 vol %, respectively. The leakage currents of the produced solid electrolytic capacitors were measured in a similar manner to that in Experiment 1. The results thereof are shown in Table 4.

TABLE 4

|  | Ratio of silica particles (vol %) | Leak current (μA) |
| --- | --- | --- |
| Experiment 22 | 74 | 130 |
| Experiment 23 | 75 | 60 |
| Experiment 1 | 78 | 30 |
| Experiment 24 | 80 | 28 |
| Experiment 25 | 82 | 30 |
| Experiment 26 | 85 | 65 |
| Experiment 27 | 86 | 110 |

As shown in Table 4, it was found out that any of the leakage currents of the solid electrolytic capacitors of Experiments 1, and 22 to 27 was sufficiently smaller than the leakage currents of the solid electrolytic capacitors of Experiments 3 to 8. In particular, since the leakage currents of the solid electrolytic capacitors of Experiments 1, and 23 to 26 were small, it can be stated that the ratio of the silica particles serving as the filler in the outer package is preferably in a range of 75 vol % to 85 vol %, and further preferably in a range of 78 vol % to 82 vol %.

Experiments 28 to 36

Next, a relationship between the filler in the outer package and the leakage current was examined. The solid electrolytic capacitors of Experiments 28 to 36 were produced in a similar manner to that of Experiment 1 except that, instead of setting a ratio of spherical silica particles contained in silica particles to be mixed as the filler to be about 75 weight %, 0 weight %, about 10 weight %, 15 weight %, 20 weight %, 30 weight %, 50 weight %, 90 weight %, 95 weight % and 100 weight %, are respectively set. It should be noted that, in any of the cases, the remaining portions of the spherical silica particles to be mixed as the filler were silica particles of indeterminate form. Then, the leakage currents of the produced solid electrolytic capacitors were evaluated in a similar manner to that in Experiment 1. The results thereof are shown in Table 5.

TABLE 5

| | Ratio of spherical silica (weight %) | Leak Current (μA) |
|---|---|---|
| Experiment 28 | 0 | 140 |
| Experiment 29 | 10 | 120 |
| Experiment 30 | 15 | 100 |
| Experiment 31 | 20 | 40 |
| Experiment 32 | 30 | 35 |
| Experiment 33 | 50 | 35 |
| Experiment 1 | 75 | 30 |
| Experiment 34 | 90 | 40 |
| Experiment 35 | 95 | 100 |
| Experiment 36 | 100 | 120 |

As shown in Table 5, it was found out that any of the leakage currents of the solid electrolytic capacitors of Experiments 1, and 28 to 36 was sufficiently smaller than the leakage currents of the solid electrolytic capacitors of Experiments 3 to 8. In particular, since the leakage currents of the solid electrolytic capacitors of Experiments 1, and 31 to 34 are small, it can be stated that, as the miring ratio of spherical silica particles to be added as the filler is preferably in a range of about 20 to 90 weight % with respect to the total weight of the filler.

Experiments 37 to 42

Next, a relationship between the thickness of niobium oxide layer and the leakage current was examined. The solid electrolytic capacitors of Experiments 37 to 42 were produced in a similar manner to that of Experiment 1 except that instead of setting the applied voltage at the time of performing anodization in a fluorine ammonium aqueous solution to be about 20V, about 15V, 40V, 50V, 60V, 70V and 80V are respectively set. Thereby, the solid electrolytic capacitors each having the different thickness of the formed niobium oxide layer were produced. Then, the leakage currents of the produced solid electrolytic capacitors were evaluated in a similar manner to that in Experiment 1. The results thereof are shown in Table 6. It should be noted that the thickness of each of the niobium oxide layers was determined from a state of distribution of oxygen according to an XPS in a similar manner to that in Experiment 1.

TABLE 6

| | Anodization voltage (V) in fluorine ammonium aqueous solution | Thickness (nm) of niobium oxide layer | Leak current (μA) |
|---|---|---|---|
| Experiment 37 | 15 | 38 | 45 |
| Experiment 1 | 20 | 50 | 30 |
| Experiment 38 | 40 | 100 | 30 |
| Experiment 39 | 50 | 125 | 30 |

TABLE 6-continued

| | Anodization voltage (V) in fluorine ammonium aqueous solution | Thickness (nm) of niobium oxide layer | Leak current (μA) |
|---|---|---|---|
| Experiment 40 | 60 | 150 | 35 |
| Experiment 41 | 70 | 175 | 100 |
| Experiment 42 | 80 | 200 | 110 |

As shown in Table 6, it was found out that any of the leakage currents of the solid electrolytic capacitors of Experiments 1, and 37 to 42 was sufficiently smaller than the leakage currents of the solid electrolytic capacitors of Experiments 3 to 8. In particular, since the leakage currents of the solid electrolytic capacitors of Experiments 1, and 37 to 40 were small, it can be stated that the thickness of the niobium oxide layer is preferably set at not greater than about 150 nm.

Experiments 43 to 47

Next, a relationship between the curing temperature at the time of forming the outer package, and the leakage current was examined. The solid electrolytic capacitors of Experiments 43 to 47 were produced in a similar manner to that in Experiment 1 except that instead of setting the heating temperature of the resin composition to be about 140° C., about 120° C., 130° C., 150° C., 160° C. and 170° C. were respectively set. Then, the leakage currents of the produced solid electrolytic capacitors were evaluated in a similar manner to that in Experiment 1. The results thereof are shown in Table 7.

TABLE 7

| | Curing temperature (° C.) | Leak current (μA) |
|---|---|---|
| Experiment 43 | 120 | 40 |
| Experiment 44 | 130 | 35 |
| Experiment 1 | 140 | 30 |
| Experiment 45 | 150 | 35 |
| Experiment 46 | 160 | 100 |
| Experiment 47 | 170 | 110 |

As shown in Table 7, it was found out that any of the leakage currents of the solid electrolytic capacitors of Experiments 1, and 43 to 47 was sufficiently smaller than the leakage currents of the solid electrolytic capacitors of Experiments 3 to 8. In particular, since the leakage currents of the solid electrolytic capacitors of Experiments 1, and 43 to 46 were small, it can be stated that the curing temperature to be used at the time of forming the outer package is preferably set at not greater than about 150° C.

It should be noted that the anode 11 is anodized by use of an ammonium fluoride aqueous solution and a phosphoric acid aqueous solution in order to form the niobium oxide layer 12 in the aforementioned embodiment. However, the present invention is not limited to this. As an aqueous solution containing fluoride ions, a potassium fluoride aqueous solution, a sodium fluoride aqueous solution or a fluoric acid aqueous solution may be used. In addition, as an aqueous solution containing phosphate ions, an ammonium phosphate aqueous solution or a sodium phosphate aqueous solution may be used.

Moreover, although the substrate 11b is formed by using niobium alloy powder containing aluminum, the present invention is not limited to this. Niobium alloy powder containing tantalum, titanium, vanadium or the like may be used.

Furthermore, in the aforementioned embodiment, the anode 11 is anodized in an aqueous solution containing phosphate ions after the anode 11 is anodized in an aqueous solution containing fluoride ions. However, the present invention is not limited to this. The anode 11 may be anodized in an aqueous solution containing both phosphate ions and fluoride ions.

In addition, although biphenyl type epoxy resin is used as the epoxy resin of the resin composition of the outer package 1 in the aforementioned embodiment, bisphenol A-type epoxy resin, bisphenol F-type epoxy resin, bisphenol S-type epoxy resin, phenol novolac-type epoxy resin, cresol novolac-type epoxy resin or the like may be used.

Furthermore, in the aforementioned embodiment, silica particles are used as the filler. However, the present invention is not limited to this. Particles such as calcium carbonate or alumina may be used.

Still further, although antimony oxide, carbana wax, γ-glycidyloxypropyl-trimethoxysilane and carbon black are added in the resin composition of the outer package 1 in the aforementioned embodiment, other than the aforementioned components, various additives such as wax types, a release agent, a coloring agent, a flame retardant, a coupling agent, a flexibilizing agent may be added.

In addition, in the present invention, as phenol resin used in a resin composition, a phenol curing agent having a phenolic hydroxyl group such as phenol novolac resin or cresol novolac resin may be used.

Moreover, in the present invention, as the imidazole compound used in the resin composition, in addition to the aforementioned 2-phenyl-4-methyl-imidazole, 2-ethyl-4-methyl-imidazole, 2-methyl-imidazole, 2-phenyl-imidazole, 2-phenyl-imidazoline, or 2-heptadecyl imidazole, modification of these may be used.

What is claimed is:

1. A solid electrolytic capacitor comprising:
   a capacitor element including a niobium oxide layer arranged between an anode and a cathode; and
   an outer package covering the capacitor element, wherein
   the niobium oxide layer contains fluorine and phosphorus, and
   the outer package contains epoxy resin, phenol resin, filler and an imidazole compound, wherein the imidazole compound is any one of 2-phenyl-4-methyl-imidazole, 2-ethyl-4-methyl-imidazole and 2-phenyl-imidazole.

2. The solid electrolytic capacitor according to claim 1, wherein
   concentration of the fluorine has maximum value at an area on the anode side of the niobium oxide layer, and
   concentration of the phosphorus has maximum value at an area on the cathode side of the niobium oxide layer.

3. The solid electrolytic capacitor according to claim 1, wherein a mixing ratio of the imidazole compound in the outer package is within a range of 0.5 to 10 part by weight with respect to 100 part by weight of the epoxy resin.

4. The solid electrolytic capacitor according to claim 1, wherein a ratio of the filler in the outer package is within a range of 75 to 85 vol %.

5. The solid electrolytic capacitor according to claim 1, wherein a ratio of the filler in the outer package is within a range of 78 to 82 vol %.

6. A solid electrolytic capacitor comprising:
   a capacitor element including a niobium oxide layer arranged between an anode and a cathode; and
   an outer package covering the capacitor element, wherein
   the niobium oxide layer contains fluorine and phosphorus, and
   the outer package contains epoxy resin, phenol resin, filler and an imidazole compound, wherein, the filler contains particles of spherical shape, and
   the mixing ratio of the particles of spherical shape is within a range of 20 to 90 percent by weight with respect to the total weight of the filler.

7. The solid electrolytic capacitor according to claim 1, wherein the thickness of the niobium oxide layer is not greater than 150 nm.

8. A method of manufacturing a solid electrolytic capacitor comprising the steps of:
   forming a capacitor element including a niobium oxide layer arranged between an anode and a cathode; and
   molding an outer package to cover the capacitor element, wherein
   the step of forming the capacitor element includes, a step of anodizing an anode containing niobium in an aqueous solution containing fluoride ions, and then anodizing the anode in an aqueous solution containing phosphate ions, and
   the step of molding the outer package includes, a step of embedding the capacitor element in a resin composition containing epoxy resin, phenol resin, filler and an imidazole compound, and then curing the resin composition by heat, wherein a temperature used at the time of curing the resin composition by heat is not greater than 150° C.

* * * * *